United States Patent
Tivesten et al.

(10) Patent No.: US 11,097,746 B2
(45) Date of Patent: Aug. 24, 2021

(54) SYSTEM AND METHOD FOR DETECTING AND/OR PREVENTING AUTOMATION EXPECTATION MISMATCH IN VEHICLE

(71) Applicant: Volvo Car Corporation, Gothenburg (SE)

(72) Inventors: Emma Tivesten, Källered (SE); Mikael Ljung Aust, Västra Frölunda (SE); Trent Victor, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/601,682

(22) Filed: Oct. 15, 2019

(65) Prior Publication Data
US 2020/0122745 A1    Apr. 23, 2020

(30) Foreign Application Priority Data
Oct. 17, 2018  (EP) .................................... 18200909

(51) Int. Cl.
| | |
|---|---|
| *B60W 50/16* | (2020.01) |
| *B60K 28/06* | (2006.01) |
| *B60W 40/09* | (2012.01) |
| *G05D 1/02* | (2020.01) |
| *G06K 9/00* | (2006.01) |
| *B60W 40/08* | (2012.01) |

(52) U.S. Cl.
CPC ........... *B60W 50/16* (2013.01); *B60K 28/066* (2013.01); *B60W 40/09* (2013.01); *G05D 1/021* (2013.01); *G06K 9/00845* (2013.01); *B60W 2040/0818* (2013.01)

(58) Field of Classification Search
CPC ................................................... A61B 5/04012
USPC ........................................................ 340/576
See application file for complete search history.

(56) References Cited

U.S. PATENT DOCUMENTS

| | | | |
|---|---|---|---|
| 2005/0030184 A1 | 2/2005 | Victor | |
| 2006/0287779 A1 | 12/2006 | Smith et al. | |
| 2010/0045451 A1* | 2/2010 | Periwal | ................... B60Q 9/00 340/439 |

(Continued)

FOREIGN PATENT DOCUMENTS

| | | |
|---|---|---|
| DE | 102011011714 A1 | 8/2012 |
| DE | 102014201036 A1 | 7/2015 |

OTHER PUBLICATIONS

Sep. 12, 2019 European Search Report issued on International Application No. EP18200909.

*Primary Examiner* — Fabricio R Murillo Garcia
(74) *Attorney, Agent, or Firm* — Clements Bernard Walker; Christopher L. Bernard

(57) ABSTRACT

The present invention relates to a method of evaluating a current risk of mismatch between actual driving automation capabilities of a vehicle and driving automation capabilities of the vehicle expected by a driver. The method comprises monitoring at least one physical property of the driver indicative of a gaze direction; determining a first visual attention metric value indicative of a level of visual attention to the road ahead; comparing the first visual attention metric value to a first threshold value; and providing, when the comparison indicates that the current level of visual attention to the road is lower than the first threshold level, a signal indicative of an elevated risk of expectation mismatch.

18 Claims, 8 Drawing Sheets

(56) References Cited

U.S. PATENT DOCUMENTS

| | | | |
|---|---|---|---|
| 2011/0210867 A1* | 9/2011 | Benedikt | G08G 1/096716 |
| | | | 340/905 |
| 2015/0149036 A1* | 5/2015 | You | B60W 30/12 |
| | | | 701/41 |
| 2015/0344029 A1 | 12/2015 | Silvlin | |
| 2016/0110618 A1* | 4/2016 | Oba | G06K 9/6215 |
| | | | 348/148 |
| 2016/0307056 A1* | 10/2016 | Schiek | G06F 3/012 |
| 2017/0053513 A1* | 2/2017 | Savolainen | A61B 5/18 |
| 2018/0229768 A1 | 8/2018 | Ma et al. | |
| 2018/0285665 A1 | 10/2018 | Paszkowicz et al. | |

* cited by examiner

SYSTEM AND METHOD FOR DETECTING AND/OR PREVENTING AUTOMATION EXPECTATION MISMATCH IN VEHICLE

CROSS-REFERENCE TO RELATED APPLICATION

The present disclosure claims the benefit of priority of co-pending European Patent Application No. 18200909.2, filed on Oct. 17, 2018, and entitled "SYSTEM AND METHOD FOR DETECTING AND/OR PREVENTING AUTOMATION EXPECTATION MISMATCH IN VEHICLE," the contents of which are incorporated in full by reference herein.

TECHNICAL FIELD

The present invention relates to a method and system for evaluating a current risk of mismatch between actual driving automation capabilities of a vehicle having a driving automation system and driving automation capabilities of the vehicle expected by a driver operating the vehicle, and to a vehicle.

BACKGROUND

One key challenge in development of automated vehicles is overreliance, whereby drivers disengage too much with driving because they believe the automation has more capability than it actually does. Before automated vehicles are perfect, the driver will need to occasionally intervene while using highly reliable (but not perfect) automation. Thus, understanding how to design automated vehicle systems to achieve good driver supervision engagement and conflict intervention performance is critical. The reason why drivers must supervise (should not exhibit overreliance) is because imperfect automation and crash avoidance systems have limitations. Common limitations for current automated vehicles include, for example, restrictions in operating speed ranges, how much steering, braking and acceleration the system can apply, and limitations in lane and object detection (e.g. pedestrians, animals, on-road objects, and oncoming vehicles). Additionally, the driver needs to supervise for system faults ranging from sensor blockage to brake pump failure, as these may require immediate intervention. Thus the driver both supervises ongoing automation performance and detection of pre-crash conditions.

It is a well-known irony of automation that the better automation becomes, the less capable operators are at detecting and acting on automation failures. Key challenges in deploying vehicle automation are therefore:

(1) to avoid driver mental model mistakes regarding their expectations of automation performance, and (2) to ensure that the requirements on driver behavior by vehicle automation are met when failures and limitations of automation occur.

One important aspect in the strive towards safer operation of autonomous vehicles that may sometimes need driver intervention is thus the ability to correctly evaluate the risk of a mismatch between the actual driving automation capabilities of the vehicle and the driving automation capabilities that the driver expects the vehicle to have.

SUMMARY

In view of this, it is thus an object of the present invention to enable reliable detection of a mismatch between the actual driving automation capabilities of the vehicle and the driving automation capabilities that the driver expects the vehicle to have.

According to a first aspect of the present invention, it is therefore provided a method of evaluating a current risk of mismatch between actual driving automation capabilities of a vehicle having a driving automation system and driving automation capabilities of the vehicle expected by a driver operating the vehicle, the method comprising the steps of: monitoring, during driving automation operation of the vehicle, at least one physical property of the driver indicative of a gaze direction of the driver; determining, based on the at least one physical property, at least a first visual attention metric value indicative of a current level of visual attention to a traffic scene ahead of the vehicle; comparing the at least first visual attention metric value to at least a first threshold value indicative of a first predefined threshold level of visual attention to the traffic scene ahead of the vehicle; and providing, when the comparison indicates that the current level of visual attention to the traffic scene ahead of the vehicle is lower than the first threshold level, a signal indicative of an elevated risk of mismatch between actual driving automation capabilities of the vehicle and driving automation capabilities of the vehicle expected by the driver operating the vehicle.

The above-mentioned "physical property indicative of gaze direction": may include head rotation and position, and glance direction. A glance is made up of a sequence of eye fixations towards an area-of-interest (e.g. instrument cluster, mirror, vehicle path, forward roadway, etc).

In the context of the present application, a "visual attention metric value indicative of a level of visual attention to a traffic scene ahead of the vehicle" should be understood to mean the value of any metric that can indicate how attentive the driver is to events occurring along the vehicle path in front of the vehicle. Such a metric may be devised to indicate how much attention the driver pays to events occurring elsewhere than in the front of the vehicle, and may, for example, capture a frequency of off-road glances and/or a duration of off-road glances etc.

The signal indicative of an elevated risk of mismatch may be any signal useable to trigger one or several measures aimed at removing the mismatch. Thus, this signal may be an analog or digital signal, which may be an internal signal in a control unit, or a signal between different control units, etc.

In embodiments, the method may include the step of determining the gaze direction of the driver based on the at least one physical property of the driver. The at least one visual attention metric may be determined based on the gaze direction. Alternatively, the at least one visual attention metric may be determined directly based on the monitored at least one physical property of the driver.

The present inventors have performed behavioral tests indicating that as many as 28% of drivers crashed despite having their eyes on the conflict object (garbage bag, or parked car) while using highly reliable (but not perfect) driving automation. When analyzing these tests, the inventors surprisingly found that, although crashing drivers looked ahead when the crash occurred, there is a strong correlation between drivers exhibiting a low level of visual attention to the forward roadway prior to encountering the conflict object, and drivers who did not intervene, but allowed the vehicle to crash into the conflict object. In other words, the present inventors have surprisingly found that there is a strong correlation between low levels of visual attention to the forward roadway during autonomous vehicle operation and an elevated risk of mismatch between actual driving automation capabilities of a vehicle and driving automation capabilities of the vehicle expected by the driver operating the vehicle.

This mismatch, which may be referred to as "Automation Expectation Mismatch" (AEM) demonstrates that a key component of driver engagement while using automation is cognitive (understanding the need for action), rather than purely visual (looking at the threat), or having hands-on-wheel. Cognitive understanding of the need to act is a crucial component of driver engagement while using driving automation systems that are not perfect. AEM is thus a newly discovered cognitive state of mind.

According to various embodiments of the present invention, the step of determining the at least one visual attention metric value may comprise the steps of: determining, for a predetermined first period of time, a measure indicative of a proportion of the first period of time during which the driver looks towards the traffic scene ahead of the vehicle; and determining the at least one visual attention metric value based on the measure.

Alternatively, or as a complement, the number of long (such as longer than three seconds) off-road glances during a predefined period of time may be used as a visual attention metric.

In various embodiments, the method according to the present invention may further comprise the steps of providing an alert for the driver; determining at least one alert responsiveness metric value, indicative of the driver's responsiveness to the alert; comparing the at least one alert responsiveness metric value to at least one threshold value indicative of a predefined threshold level of alert responsiveness; and providing, when the comparison indicates that the alert responsiveness of the driver is lower than the threshold level, the signal indicative of an elevated risk of mismatch between actual driving automation capabilities of the vehicle and driving automation capabilities of the vehicle expected by the driver operating the vehicle.

The above-mentioned "alert" may also be referred to as a "reminder" or "warning". Such an alert may be provided by a system according to embodiments of the present invention, or any other driving related system of the vehicle. For instance, the alert may request the driver to put his/her hands back on the steering wheel, or to look at the road, etc. The alert could also be an instruction for the driver that is not directly related to the driving situation, such as an instruction for the driver to push a particular button, or similar.

Advantageously, the alert may include an indication of a desired change in behavior of the driver; and the at least one alert responsiveness metric value may be determined based on a time from an onset of the alert until the desired change in behavior of the driver is detected. For instance, the time from the provision of instructions to hold the steering wheel with both hands, until the driver actually holds the steering wheel with both hands can be measured and used as an alert responsiveness metric. If the measured time until the driver again properly holds the steering wheel may then be used in the identification of an elevated risk of expectation mismatch.

In various embodiments of the method according to the present invention, the method may further comprise the steps of determining, based on the at least one physical property of the driver indicative of a gaze direction of the driver, at least a second visual attention metric value indicative of a current level of visual attention to a traffic scene ahead of the vehicle; comparing the at least second visual attention metric value to at least a second threshold value indicative of a second predefined threshold level of visual attention to the traffic scene ahead of the vehicle; and providing, when the comparison indicates that the current level of visual attention to the traffic scene ahead of the vehicle is higher than the second threshold level, the signal indicative of an elevated risk of mismatch between actual driving automation capabilities of the vehicle and driving automation capabilities of the vehicle expected by the driver operating the vehicle.

Using this second evaluation of the visual attention to the traffic scene ahead of the vehicle, drivers tending to spend much time looking at the road ahead can be identified. Since it has been surprisingly found that this class of drivers also exhibit an elevated risk of expectation mismatch behavior (and thus an increased risk of failing to take over driving command in situations when this is required for crash avoidance), these embodiments provide for improved identification of drivers with an elevated risk.

In various embodiments of the method according to the present invention, the method may further comprise the step of modifying, following detection of an elevated risk of mismatch between actual driving automation capabilities of the vehicle and driving automation capabilities of the vehicle expected by the driver operating the vehicle, at least one driving automation property of the vehicle.

When an elevated risk of expectation mismatch is detected, various actions may be taken to reduce the risk of expectation mismatch. These actions may be escalated for detected higher risks, and could end with interventions and/or safely stopping the vehicle.

The present inventors have found that an efficient way of reducing the risk of expectation mismatch is to reduce the perceived driving automation capabilities of the vehicle. This serves to reduce the driving automation capabilities of the vehicle expected by the driver.

According to a further aspect of the present invention, it is thus provided a driving automation method for a vehicle, the method comprising the steps of: identifying a lane of a road traveled by the vehicle; controlling a steering of the vehicle towards keeping the vehicle within a first regulation corridor in the lane, the first regulation corridor having a first width; and intermittently controlling the steering of the vehicle towards keeping the vehicle within a second regulation corridor in the lane, the second regulation corridor having a second width greater than the first width.

When the steering is not controlled towards the second regulation corridor, the steering may be controlled back towards the first regulation corridor.

A driving automation system is also provided, including processing circuitry configured to identify a lane of a road traveled by the vehicle; control a steering of the vehicle towards keeping the vehicle within a first regulation corridor in said lane, said first regulation corridor having a first width; and intermittently control the steering of the vehicle towards keeping the vehicle within a second regulation corridor in said lane, said second regulation corridor having a second width greater than said first width.

To achieve degeneration with a sufficiently non-robust mapping between inputs and outputs, a dual corridor deadband can be used. A dual corridor deadband means that the vehicle with a randomized frequency switches between regulating toward a smaller and a wider regulation corridor (smaller vs wider lane center if you will), with the frequency of "falling through" from the smaller to the larger corridor happening with a lower frequency while drivers have eyes on the road and higher frequency when drivers' eyes are off the road.

To the driver, an implementation that follows this principle will not be possible for a driver to rely on for developing automated behavior, because the input-output mapping from the drivers perspective, as well as objectively, will be stochastic. In math terms, the dual-deadband corridor principle represents regulation toward two sinusoidal functions, on top of which the actual road geometry adds a third sinusoidal. It is mathematically proven that summing three sinusoidal curves of different amplitude and frequency provides randomized output.

According to a further aspect of the present invention, it is provided a system for evaluating a current risk of mismatch between actual driving automation capabilities of a vehicle having a driving automation system and driving automation capabilities of the vehicle expected by a driver operating the vehicle, the system comprising: at least one sensor for sensing at least one physical property of a driver indicative of a gaze direction of the driver; and processing circuitry coupled to the at least one sensor and configured to: receive, from the at least one sensor, a signal indicative of the at least one physical property of the driver; determine, based on the at least one physical property, at least a first visual attention metric value indicative of a current level of visual attention to a traffic scene ahead of the vehicle; compare the at least first visual attention metric value to at least a first threshold value indicative of a first predefined threshold level of visual attention to the traffic scene ahead of the vehicle; and provide, when the comparison indicates that the current level of visual attention to the traffic scene ahead of the vehicle is lower than the first threshold level, a signal indicative of an elevated risk of mismatch between actual driving automation capabilities of the vehicle and driving automation capabilities of the vehicle expected by the driver operating the vehicle.

In summary, according to various embodiments the present invention relates to a method of evaluating a current risk of mismatch between actual driving automation capabilities of a vehicle and driving automation capabilities of the vehicle expected by a driver. The method comprises monitoring at least one physical property of the driver indicative of a gaze direction; determining a first visual attention metric value indicative of a level of visual attention to the road ahead; comparing the first visual attention metric value to a first threshold value; and providing, when the comparison indicates that the current level of visual attention to the road is lower than the first threshold level, a signal indicative of an elevated risk of expectation mismatch.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

Figure 1:
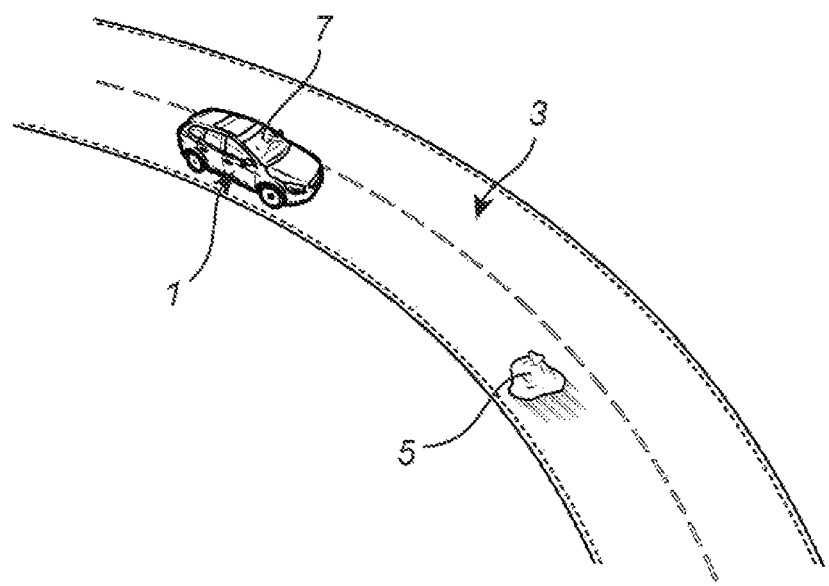
FIG. 1 is an illustration of a driving situation in which expectation mismatch may result in a collision.

FIG. 1 schematically shows a vehicle 1 traveling on a road 3 towards an obstacle 5 on the road 3. The vehicle 1 in FIG. 1 has certain driving automation capabilities, but is not a fully autonomous car. Therefore, a driver 7 has to be ready to intervene when a traffic situation requires driving capabilities going beyond the actual driving automation capabilities of the vehicle 1. For the purpose of explaining embodiments of the present invention, the obstacle 5 in FIG. 1 may be taken to represent an object with which the vehicle 1 would collide without intervention by the driver 7. It should be understood that this is for illustrative purposes only.

Figure 2A:
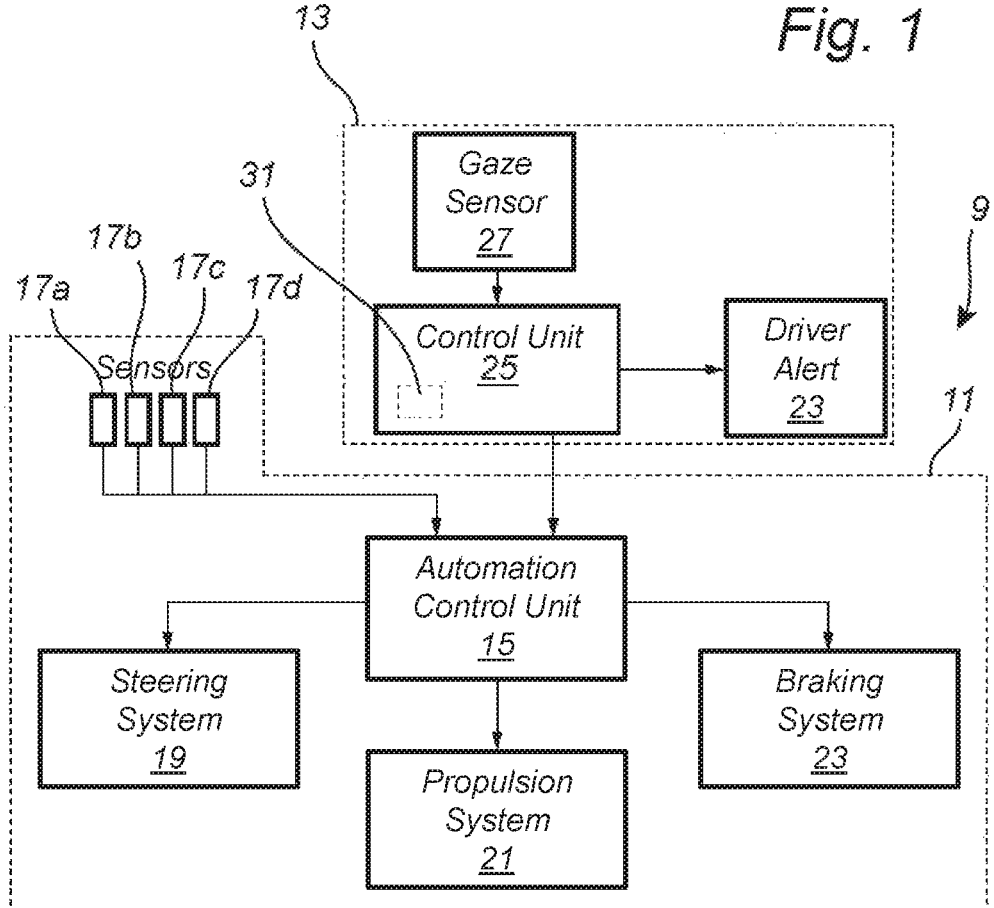
FIG. 2A is a schematic simplified block diagram schematically illustrating a system according to an embodiment of the present invention.

FIG. 2A is a schematic simplified block diagram schematically illustrating a combined driving automation system and an embodiment of a system for evaluating a current risk of mismatch between actual driving automation capabilities of a vehicle having a driving automation system and driving automation capabilities of the vehicle expected by a driver operating the vehicle. The latter system will be referred to as a risk evaluation and mitigation system.

Referring to FIG. 2A, the combined system 9 thus comprises a driving automation system 11 and a risk evaluation and mitigation system 13. The driving automation system 11 comprises processing circuitry, here in the form of a driving automation control unit 15, various sensors 17a-d, the steering system 19 of the vehicle 1, the propulsion system 21 of the vehicle 1, and the braking system 23 of the vehicle 1. The risk evaluation and mitigation system 13 comprises processing circuitry, here in the form of control unit 25, a gaze sensor 27, and a driver alert interface 29. As is schematically indicated in FIG. 2A, the control unit 25 comprises a counter 31.

In the driving automation system 11, the driving automation control unit 15 is coupled to the various sensors 17a-d for acquiring driving-related information sensed by the sensors, and to the control unit 25 of the risk evaluation and mitigation system 13 for receiving commands from the risk evaluation and mitigation system 13. As is indicated in FIG. 2A, the driving automation control unit 15 is further coupled to the steering system 19, the propulsion system 21, and the braking system 23, for controlling these systems based on the information received from the sensors 17a-d, the commands from the control unit 25 of the risk evaluation and mitigation system 13, and other data not indicated in the simplified illustration in FIG. 2A.

In the risk evaluation and mitigation system 13, the control unit 25 is coupled to the gaze sensor 27 for acquiring information indicative of a gaze direction of the driver 7 from the gaze sensor 27, and to the driver alert interface 29 for controlling the driver alert interface 29 to provide alerts to the driver 7.

Figure 2B:
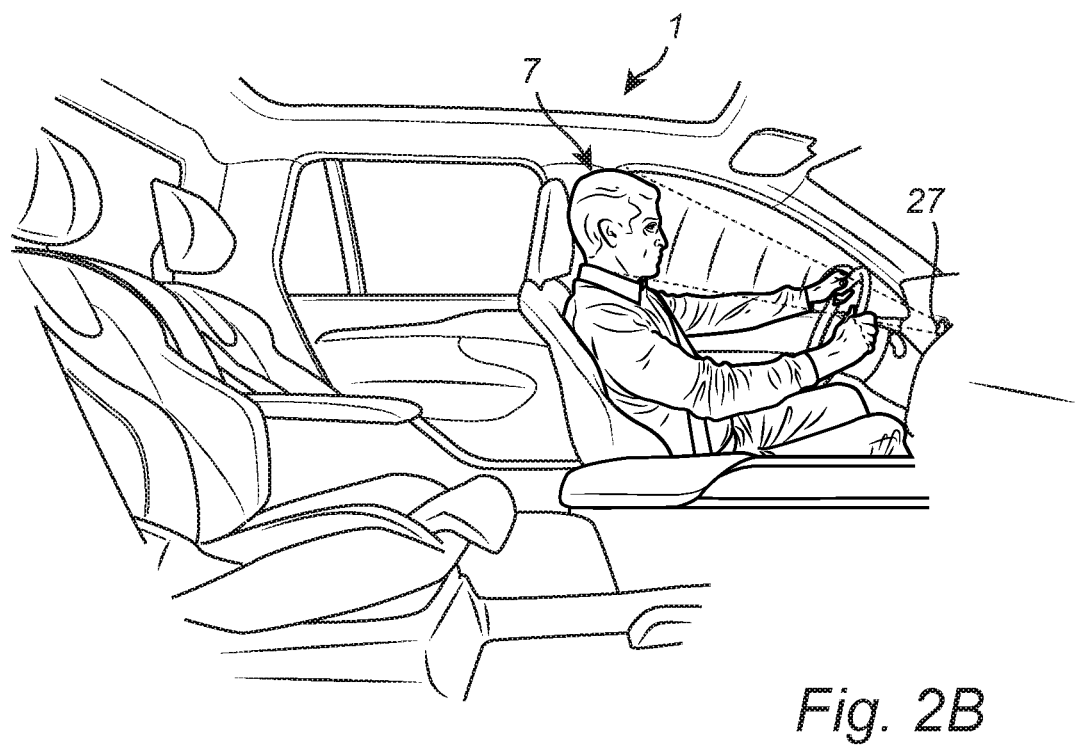
FIG. 2B illustrates an example interior or the vehicle in FIG. 1.

FIG. 2B is a schematic illustration of the interior of the vehicle 1 in FIG. 1, mainly for showing a possible location of the gaze sensor 27 in relation to the driver 7.

Figure 3:
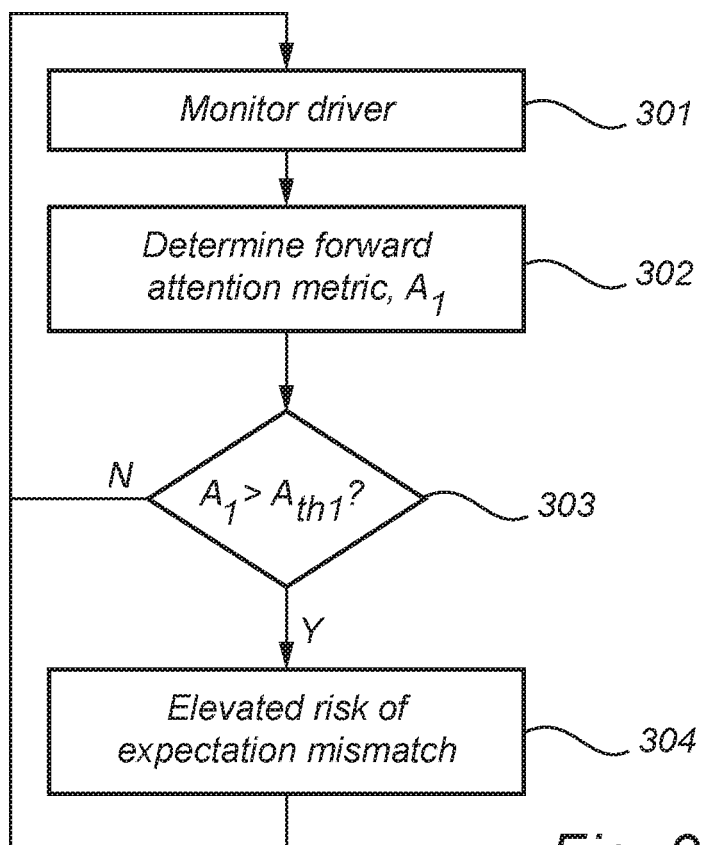
FIG. 3 is a flow-chart schematically illustrating a first embodiment of a method according to the present invention.

FIG. 3 is a flow-chart schematically illustrating a first embodiment of a method according to the present invention.

In a first step 301, at least one physical property indicative of the gaze direction of the driver 7 is monitored. Referring to FIGS. 2A-B, the control unit 25 of the risk evaluation and mitigation system 13 may control the gaze sensor 27 to acquire information indicative of eye and/or head orientation of the driver 7.

In the subsequent step 302, at least a first visual attention metric A1 indicative of a level of visual attention to the traffic scene ahead of the vehicle 1 is determined by the control unit 25 based on the information acquired from the gaze sensor 27.

Figure 4:
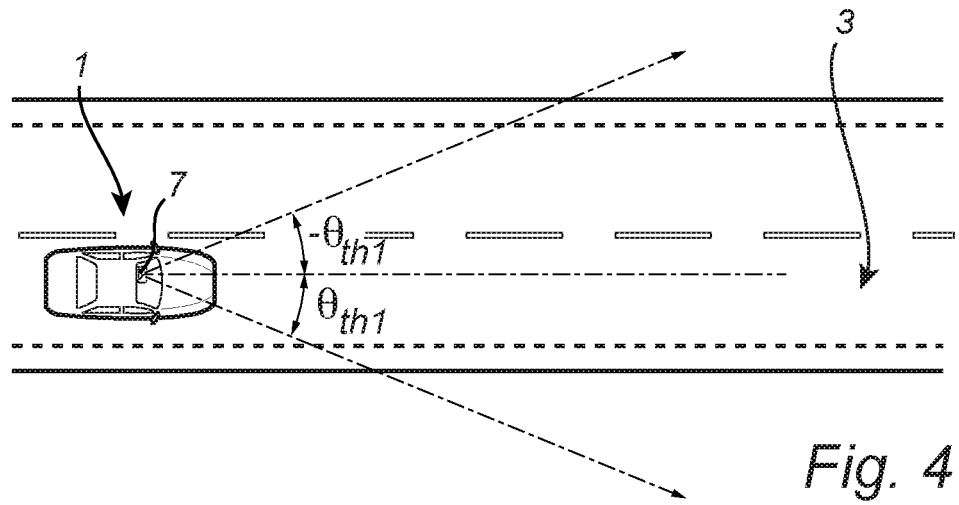
FIG. 4 schematically illustrates determination of an example visual attention metric used in the method in FIG. 3.

Referring to FIG. 4, a gaze towards the traffic scene ahead of the vehicle 1 may be represented by a gaze being within the angular range $-\theta$th to $+\theta$th. It should be noted that this is a simplified illustration, and that a "forward gaze" would in practice be defined by a more complex geometric constraint.

Figure 5:
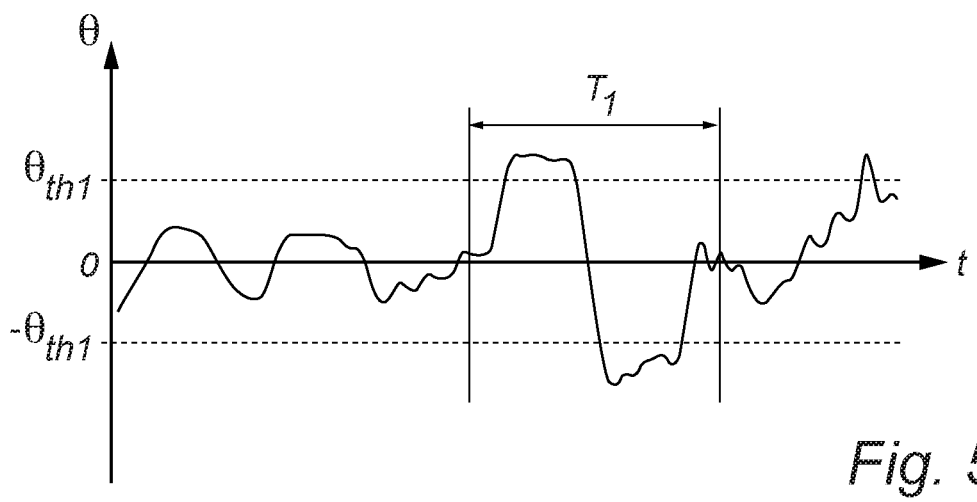
FIG. 5 schematically illustrates determination of an example visual attention metric used in the method in FIG. 3.

Turning now to FIG. 5, one example of a suitable first visual attention metric A1 may be based on a measure indicative of a proportion of a first period of time T1 during which the driver 7 looks towards the traffic scene ahead of the vehicle 1.

According to one illustrative example, the first visual attention metric A1 may be defined according to the following:

A1(t)=The fraction of time the driver 7 looks ahead less than 30% of a moving time window having the duration T1 (for the example case of T1=4 s, this means that the driver 7 has his eyes on the road 5 ahead during less than 1.2 s, and off the road 5 ahead more than 2.8 s).

In the next step 303, the first visual attention metric value determined in step 302 is compared to at least a first threshold value Ath1 indicative of a first predefined threshold level of visual attention to the road ahead of the vehicle 1.

According to one illustrative example, two values of the first visual attention metric A1(t), for different times, may be compared to respective thresholds according to the following:

Ath1a: 3% of the time during the last 6 minutes.
Ath1b: 3% of the time during the last 30 minutes.

When A1>Ath1a and A1>Ath1b, it may be determined that the driver 7 exhibits an elevated risk of expectation mismatch.

If this is the case, the method proceeds to step 304, in which the control unit 25 of the risk evaluation and mitigation system 13 provides a signal indicative of an elevated risk of expectation mismatch. This signal may, for example, be provided to the driving automation system 11. Otherwise, the method returns to step 301.

Figure 6:
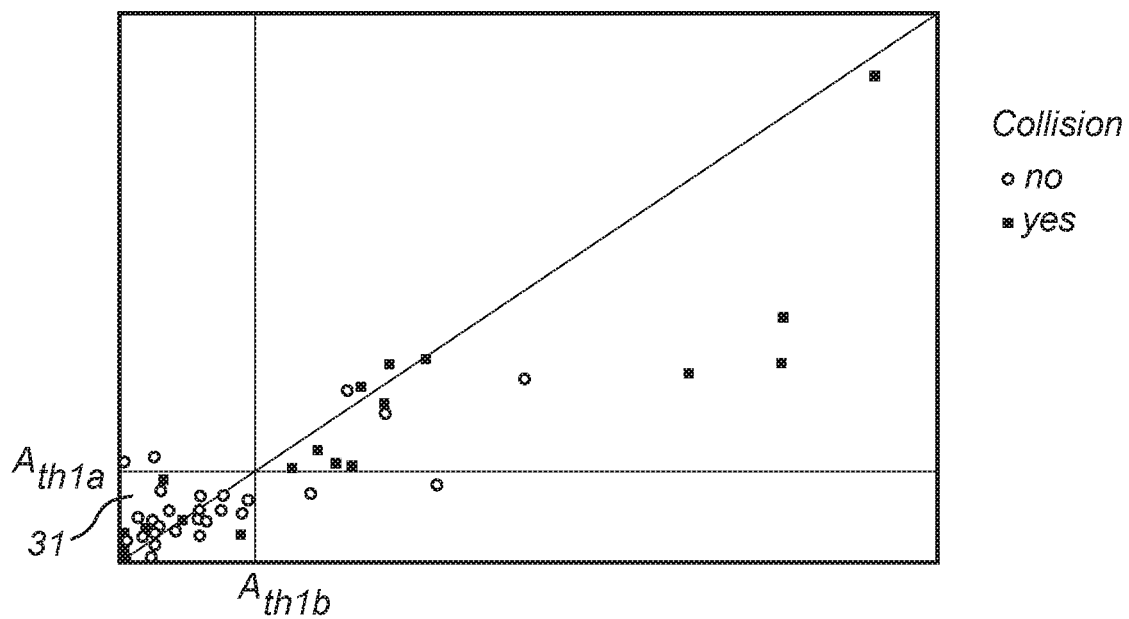
FIG. 6 is a diagram illustrating a determined correlation between elevated risk of expectation mismatch determined using the method in FIG. 3 and observed collisions due to expectation mismatch.

FIG. 6 is a diagram illustrating a determined correlation between elevated risk of expectation mismatch determined using the method in FIG. 3 and observed collisions due to expectation mismatch. In the diagram of FIG. 6, the drivers 7 exhibiting a current level of visual attention to the road ahead of the vehicle 1 that is sufficiently low to indicate an elevated risk of expectation mismatch are those in the bottom left rectangle 31.

In the field tests referred to in the Summary section above, the method according to the first embodiment of the present invention achieved an accuracy of 0.778, a sensitivity of 0.571, and a specificity of 0.769.

Here, "accuracy" is defined as (TP+TN)/Ntot, "sensitivity" is defined as TP/(TP+FN), and "specificity" is defined as TN/(TN+FN), where:

TP (True Positive) is the number of drivers for which the method predicted a collision and a collision actually occurred.

FP (False Positive) is the number of drivers for which the method predicted a collision and no collision occurred.

TN (True Negative) is the number of drivers for which the method predicted that no collision would occur and no collision occurred.

FN (False Negative) is the number of drivers for which the method predicted that no collision would occur and a collision occurred.

Ntot is the total number of drivers.

Figure 7:
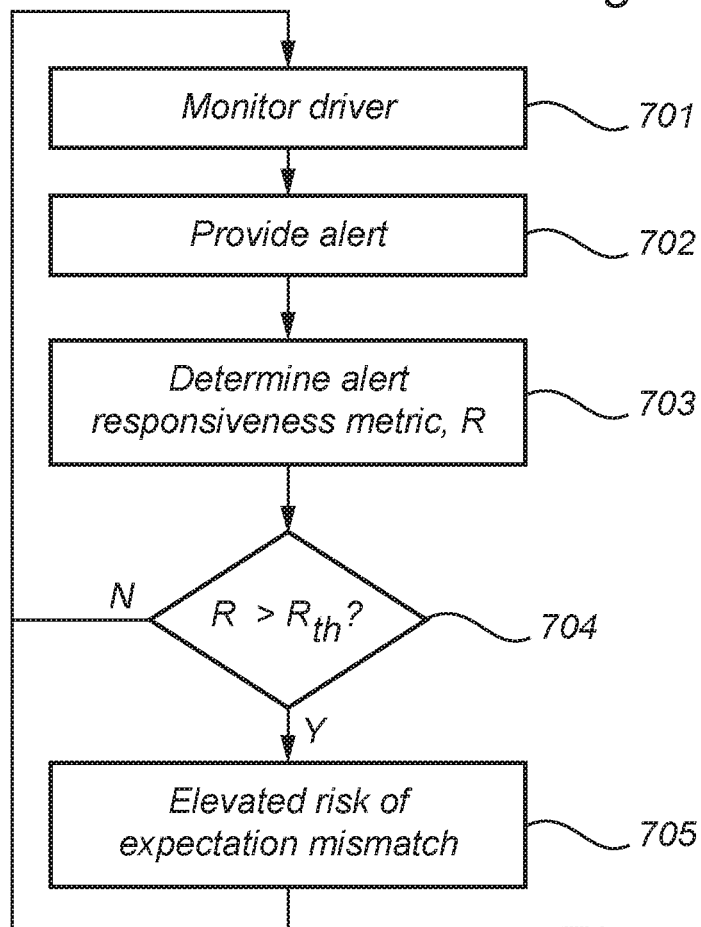
FIG. 7 is a flow-chart schematically illustrating a second embodiment of a method according to the present invention.

FIG. 7 is a flow-chart schematically illustrating a second embodiment of a method according to the present invention.

In a first step 701, at least one physical property indicative of the gaze direction of the driver 7 is monitored. Referring to FIGS. 2A-B, the control unit 25 of the risk evaluation and mitigation system 13 may control the gaze sensor 27 to acquire information indicative of eye and/or head orientation of the driver 7.

In the subsequent step 702, an alert is provided to the driver 7. Examples of possible alerts were provided in the Summary section above. Referring to FIG. 2A, the control unit 25 of the risk evaluation and mitigation system 13 may control the driver alert interface 29 to provide a driver alert.

In the next step 703, an alert responsiveness value R is determined.

According to one illustrative example, the alert responsiveness metric R may be defined according to the following:

R=Mean response time from alert onset to driver compliance.

In the next step 704, the alert responsiveness value determined in step 703 is compared to at least a first threshold value Rth indicative of a predefined threshold level of alert responsiveness.

According to one illustrative example, the responsiveness metric R may be compared to the threshold value Rth according to the following:

Rth: 0.9 seconds average response time

When R>Rth, it may be determined that the driver 7 exhibits an elevated risk of expectation mismatch.

If this is the case, the method proceeds to step 705, in which the control unit 25 of the risk evaluation and mitigation system 13 provides a signal indicative of an elevated risk of expectation mismatch. This signal may, for example, be provided to the driving automation system 11. Otherwise, the method returns to step 701.

Figure 8:
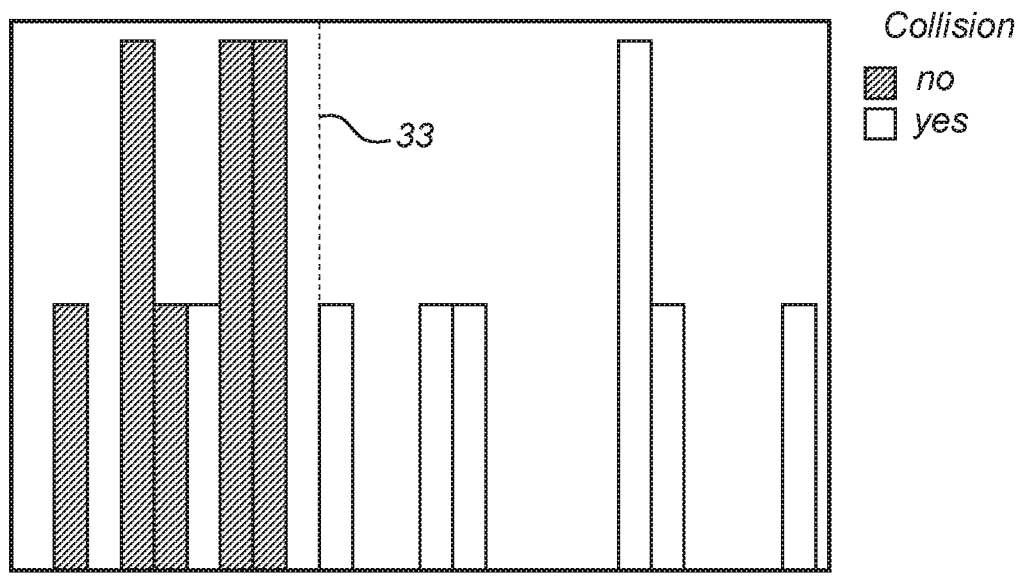
FIG. 8 is a diagram illustrating a determined correlation between elevated risk of expectation mismatch determined using the method in FIG. 7 and observed collisions due to expectation mismatch.

FIG. 8 is a diagram illustrating a determined correlation between elevated risk of expectation mismatch determined using the method in FIG. 7 and observed collisions due to expectation mismatch. In the diagram of FIG. 8, the drivers 7 exhibiting a responsiveness that is sufficiently low to indicate an elevated risk of expectation mismatch are those to the right of the dashed line 33 in FIG. 8.

In the field tests referred to in the Summary section above, the method according to the second embodiment of the present invention achieved an accuracy of 0.741, a sensitivity of 0.333, and a specificity of 0.702.

Figure 9:
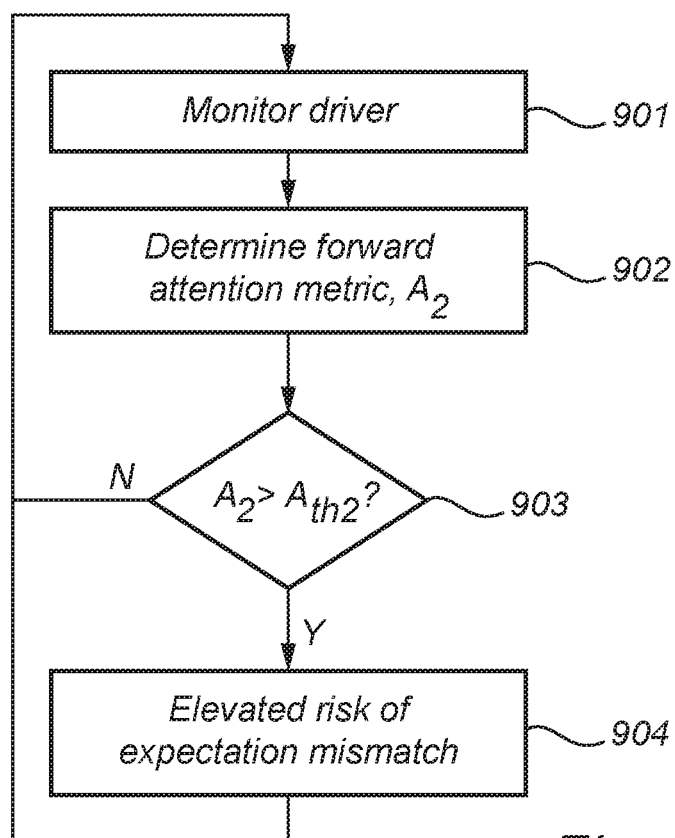
FIG. 9 is a flow-chart schematically illustrating a third embodiment of a method according to the present invention.

FIG. 9 is a flow-chart schematically illustrating a third embodiment of a method according to the present invention.

In a first step 901, at least one physical property indicative of the gaze direction of the driver 7 is monitored. Referring to FIGS. 2A-B, the control unit 25 of the risk evaluation and mitigation system 13 may control the gaze sensor 27 to acquire information indicative of eye and/or head orientation of the driver 7.

In the subsequent step 902, at least a second visual attention metric A2 indicative of a level of visual attention to the traffic scene ahead of the vehicle 1 is determined by the control unit 25 based on the information acquired from the gaze sensor 27.

According to one illustrative example, the second visual attention metric A2 may be defined according to the following:

A2(t)=The fraction of time the driver 7 looks ahead more than 92% of a moving time window having the duration T2 (for the example case of T2=60 s, this means that the driver 7 has his eyes on the road 5 ahead during more than 55.2 s).

In the next step 903, the second visual attention metric value determined in step 902 is compared to at least a second threshold value Ath2 indicative of a second predefined threshold level of visual attention to the road ahead of the vehicle 1.

According to one illustrative example, two values of the second visual attention metric A2(t), for different times, may be compared to respective thresholds according to the following:

Ath2a: 38% of the time during the last 6 minutes.
Ath2b: 38% of the time during the last 30 minutes.

When A2>Ath2a and A2>Ath2b, it may be determined that the driver 7 exhibits an elevated risk of expectation mismatch.

If this is the case, the method proceeds to step 904, in which the control unit 25 of the risk evaluation and mitigation system 13 provides a signal indicative of an elevated risk of expectation mismatch. This signal may, for example, be provided to the driving automation system 11. Otherwise, the method returns to step 901.

Figure 10:
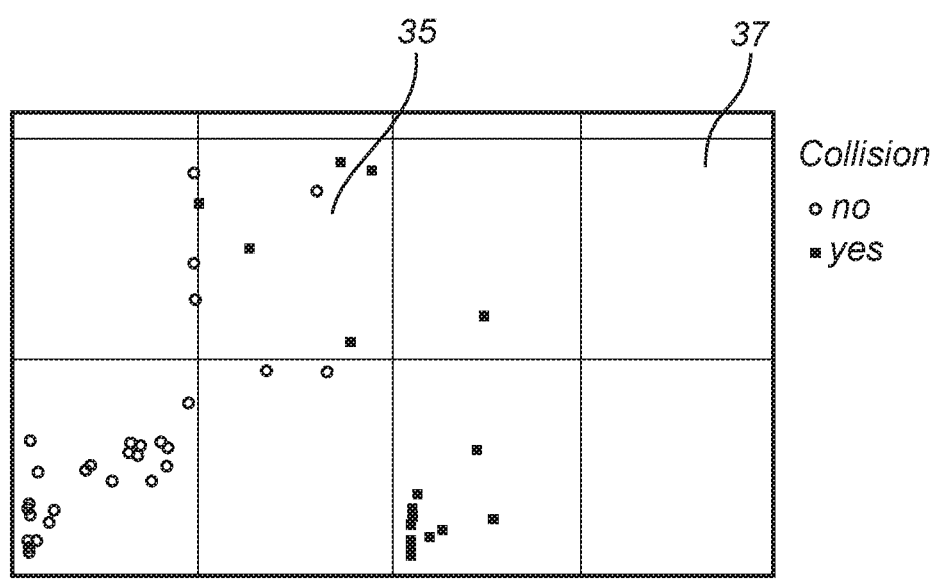
FIG. 10 is a diagram illustrating a determined correlation between elevated risk of expectation mismatch determined using the method in FIG. 9 and observed collisions due to expectation mismatch.

FIG. 10 is a diagram illustrating a determined correlation between elevated risk of expectation mismatch determined using the method in FIG. 9 and observed collisions due to expectation mismatch. In the diagram of FIG. 10, the drivers 7 exhibiting a current level of visual attention to the road ahead of the vehicle 1 that is sufficiently high to indicate an elevated risk of expectation mismatch are those in the first 35 and second 37 indicated rectangles in FIG. 10.

In the field tests referred to in the Summary section above, the method according to the third embodiment of the present invention achieved an accuracy of 0.685, a sensitivity of 0.238, and a specificity of 0.667.

Figure 11:
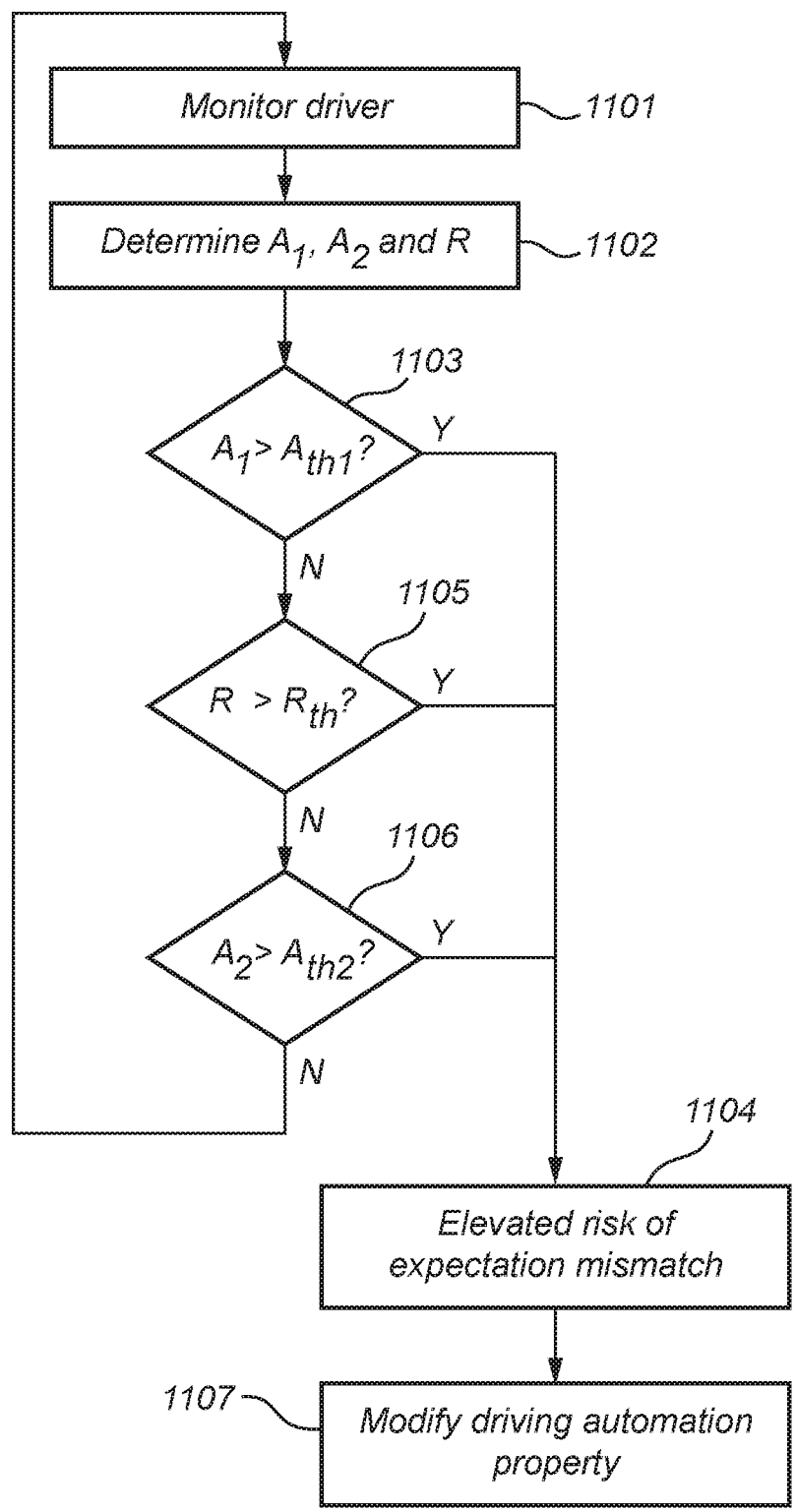
FIG. 11 is a flow-chart schematically illustrating a fourth embodiment of a method according to the present invention.

FIG. 11 is a flow-chart schematically illustrating a fourth embodiment of a method according to the present invention.

In a first step 1101, at least one physical property indicative of the gaze direction of the driver 7 is monitored. Referring to FIGS. 2A-B, the control unit 25 of the risk evaluation and mitigation system 13 may control the gaze sensor 27 to acquire information indicative of eye and/or head orientation of the driver 7.

In the subsequent step 1102, at least a first visual attention metric value A1, a responsiveness metric value R, and a second visual attention metric value A2 are determined as described above.

In the next step 1103, the first visual attention metric value A1 determined in step 1102 is compared to at least a first threshold value as described above in connection with FIG. 3.

If the comparison indicates a low level of visual attention to the road ahead of the vehicle 1, the method proceeds to step 1104, in which the control unit 25 of the risk evaluation and mitigation system 13 provides a signal indicative of an elevated risk of expectation mismatch. Otherwise, the method proceeds to step 1105.

In step 1105, the responsiveness metric value R determined in step 1102 is compared to at least a first threshold value as described above in connection with FIG. 7. If the comparison indicates a low level of alert responsiveness, the method proceeds to step 1104. Otherwise, the method proceeds to step 1106.

In step 1106, the second visual attention metric value A2 determined in step 1102 is compared to at least a second threshold value as described above in connection with FIG. 9. If the comparison indicates a high level of alert responsiveness, the method proceeds to step 1104. Otherwise, the method returns to step 1101.

In this embodiment, the signal generated in step 1104 is provided to the driving automation control unit 15 of the driving automation system 11. In response to receiving this signal, the control unit 15 of the driving automation system 11 modifies at least one driving automation property of the driving automation system 11.

Figure 12:
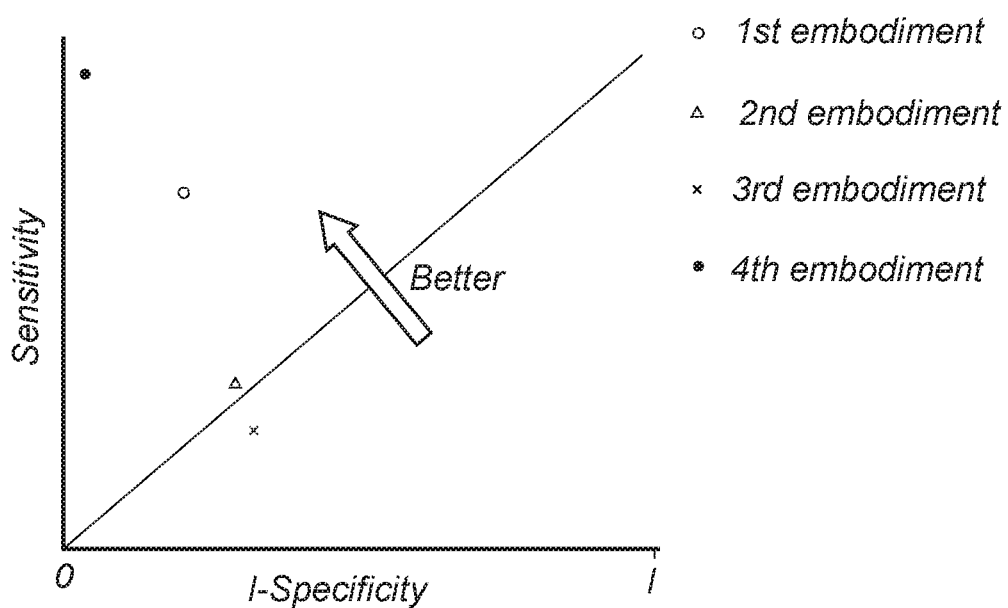
FIG. 12 is a diagram illustrating a determined correlation between elevated risk of expectation mismatch determined using the method in FIG. 11 and observed collisions due to expectation mismatch.

FIG. 12 is a diagram illustrating determined correlations between elevated risk of expectation mismatch determined using the methods according to the first, second, third, and fourth example embodiments described above. As is schematically indicated in FIG. 12, a rule for identifying drivers exhibiting an elevated risk of expectation mismatch is better the higher up to the left it is in the diagram in FIG. 12. As can be clearly seen in the diagram of FIG. 12, the method according to the fourth embodiment above provides the best result, followed by the method according to the first embodiment. As will be immediately obvious to one of ordinary skill in the art, there are many other combinations of the methods described herein and other variants that may provide almost as good results (or better) than that achieved using the fourth embodiment described above with reference to the flow-chart in FIG. 11.

In the field tests referred to in the Summary section above, the method according to the fourth embodiment of the present invention achieved an accuracy of 0.907, a sensitivity of 0.952, and a specificity of 0.967.

Figure 13:
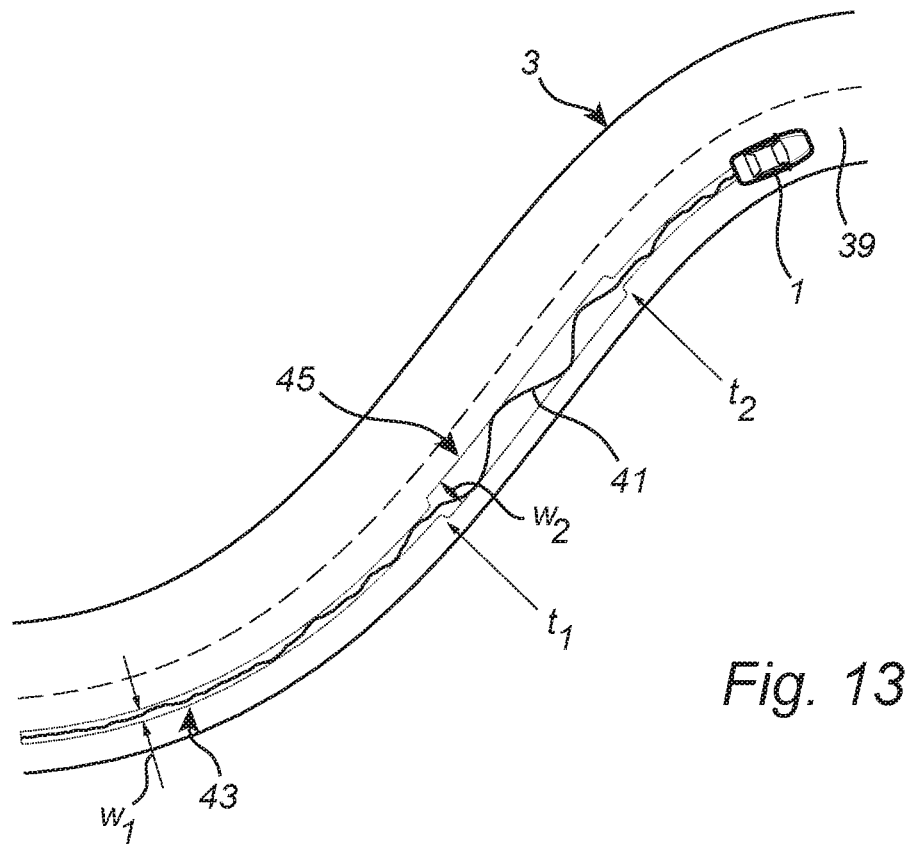
FIG. 13 schematically illustrates a method of reducing or avoiding expectation mismatch.

Finally, an example method of reducing the above-described expectation mismatch will be described with reference to FIG. 13. FIG. 13 schematically shows the vehicle 1, equipped with a driving automation system 11, in a lane 39 of the road 3. The solid line 41 in the lane 39 indicates the path of the vehicle 1 under the control of the driving automation system 11. During the first portion of the travel indicated in FIG. 13, the driving automation control unit 15 of the driving automation system 11 controls the steering system 19 of the vehicle 1 towards keeping the vehicle 1 within a first regulation corridor 43 in the lane 39. The first regulation corridor 43 has as first width w1.

At a time t1, indicated by a first arrow in FIG. 13, the risk evaluation and mitigation system 13 detects an elevated risk of expectation mismatch, in a manner described above, and the control unit 25 of the risk evaluation and mitigation system 13 provides a signal indicative thereof to the driving automation system 11.

In response to this signal, the driving automation control unit 15 of the driving automation system 11 controls the steering system 19 of the vehicle 1 towards keeping the vehicle 1 within a second regulation corridor 45 in the lane 39. The second regulation corridor 45 has as second width w2, greater than the first width w1 of the first regulation corridor 43.

Due to the increased width of the regulation corridor, the driving automation system 11 will control the vehicle 1 to move more from side to side in the lane 39. This will result in the driver 7 perceiving a reduced capability of the driving automation system 11 of the vehicle 1, which will in turn result in a reduced or eliminated expectation mismatch.

At a time t2, indicated by a second arrow in FIG. 13, the risk evaluation and mitigation system 13 may have determined that the risk of expectation mismatch has become sufficiently low to allow the driving automation system 11 to again apply the first regulation corridor 43.

As described further above in the Summary section, the switch between the first regulation corridor 43 and the second regulation corridor 45 may take place at irregular times, and without a prior indication of an elevated risk of expectation mismatch. In such aspects, the alternation between the two or more regulation corridors may be used to reduce the risk that expectation mismatch occurs.

The person skilled in the art realizes that the present invention by no means is limited to the preferred embodiments described above. On the contrary, many modifications and variations are possible within the scope of the appended claims. For example, many other metrics and combinations of metrics may be used to detect an elevated risk of expectation mismatch.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of evaluating a current risk of mismatch between actual driving automation capabilities of a vehicle having a driving automation system and driving automation capabilities of said vehicle expected by a driver operating said vehicle, and reducing said mismatch, said method comprising:
   acquiring information indicative of at least one physical property of the driver indicative of a gaze direction of the driver, during driving automation operation of said vehicle, comprising, autonomously by said vehicle, identifying a lane of a road traveled by the vehicle and controlling a steering of said vehicle towards keeping said vehicle within a first regulation corridor in said lane, said first regulation corridor having a first width;
   determining, based on said at least one physical property, at least a first visual attention metric value indicative of a level of visual attention to a traffic scene ahead of said vehicle;
   first comparing said at least first visual attention metric value to at least a first threshold value indicative of a first predefined threshold level of visual attention to the traffic scene ahead of said vehicle;
   providing, when the first comparison indicates that a current level of visual attention to the traffic scene ahead of the vehicle is lower than said first threshold level, a signal indicative of an elevated risk of mismatch between said actual driving automation capabilities of said vehicle and said driving automation capabilities of said vehicle expected by the driver operating said vehicle; and
   reducing, responsive to said signal indicative of said elevated risk of mismatch between said actual driving automation capabilities of said vehicle and said driving automation capabilities of said vehicle expected by the driver operating said vehicle, at least one perceived driving automation property of said vehicle, said reducing at least one perceived driving automation property of said vehicle comprising, autonomously by said vehicle, controlling the steering of said vehicle towards keeping said vehicle within a second regulation corridor in said lane, said second regulation corridor having a second width greater than said first width.

2. The method according to claim 1, wherein the step of determining said at least one visual attention metric value comprises:
   determining, for a predetermined first period of time, a measure indicative of a proportion of the first period of time during which the driver looks towards the traffic scene ahead of said vehicle; and
   determining said at least one visual attention metric value based on said measure.

3. The method according to claim 1, further comprising:
   providing an alert for the driver;
   determining at least one alert responsiveness metric value, indicative of a driver's responsiveness to said alert;
   second comparing said at least one alert responsiveness metric value to at least one threshold value indicative of a predefined threshold level of alert responsiveness; and
   providing, when the second comparison indicates that the alert responsiveness of the driver is lower than said predefined threshold level, said signal indicative of an elevated risk of mismatch between said actual driving automation capabilities of said vehicle and said driving automation capabilities of said vehicle expected by the driver operating said vehicle.

4. The method according to claim 3, wherein:
   said alert includes an indication of a desired change in behavior of the driver; and
   said at least one alert responsiveness metric value is determined based on a time from an onset of said alert until the desired change in behavior of the driver is detected.

5. The method according to claim 1, wherein the method further comprises:
   determining, based on said at least one physical property of the driver indicative of a gaze direction of the driver, at least a second visual attention metric value indicative of a current level of visual attention to a traffic scene ahead of said vehicle;
   third comparing said at least second visual attention metric value to at least a second threshold value indicative of a second predefined threshold level of visual attention to the traffic scene ahead of said vehicle; and providing, when the third comparison indicates that the current level of visual attention to the traffic scene ahead of the vehicle is higher than said second threshold level, said signal indicative of an elevated risk of mismatch between actual driving automation capabilities of said vehicle and driving automation capabilities of said vehicle expected by the driver operating said vehicle.

6. The method according to claim 1, wherein a width of a regulation corridor is increased following detection of an elevated risk of mismatch between actual driving automation capabilities of said vehicle and driving automation capabilities of said vehicle expected by the driver operating said vehicle.

7. A system for evaluating a current risk of mismatch between actual driving automation capabilities of a vehicle having a driving automation system and driving automation capabilities of said vehicle expected by a driver operating said vehicle, and reducing said mismatch, said system comprising:
- at least one sensor for sensing at least one physical property of a driver indicative of a gaze direction of the driver; and
- processing circuitry coupled to said at least one sensor and configured to:
  - receive, from said at least one sensor, a signal indicative of said at least one physical property of the driver, during driving automation operation of said vehicle, comprising, autonomously by said vehicle, identifying a lane of a road traveled by the vehicle and controlling a steering of said vehicle towards keeping said vehicle within a first regulation corridor in said lane, said first regulation corridor having a first width;
  - determine, based on said at least one physical property, at least a first visual attention metric value indicative of a current level of visual attention to a traffic scene ahead of said vehicle;
  - compare said at least first visual attention metric value to at least a first threshold value indicative of a first predefined threshold level of visual attention to the traffic scene ahead of said vehicle;
  - provide, when the comparison indicates that a current level of visual attention to the traffic scene ahead of said vehicle is lower than said first threshold level, a signal indicative of an elevated risk of mismatch between said actual driving automation capabilities of said vehicle and said driving automation capabilities of said vehicle expected by the driver operating said vehicle; and
  - provide, responsive to said signal indicative of said elevated risk of mismatch between said actual driving automation capabilities of said vehicle and said driving automation capabilities of said vehicle expected by the driver operating said vehicle, a command to said driving automation system to reduce perceived driving automation capabilities of said vehicle, said reducing said perceived driving automation capabilities of said vehicle comprising, autonomously by said vehicle, controlling the steering of said vehicle towards keeping said vehicle within a second regulation corridor in said lane, said second regulation corridor having a second width greater than said first width.

8. The system according to claim 7, wherein said processing circuitry is further configured to:
- determine at least one alert responsiveness metric value, indicative of the driver's responsiveness to an alert;
- compare said at least one alert responsiveness metric value to at least one threshold value indicative of a predefined threshold level of alert responsiveness; and
- provide, when the comparison indicates that the alert responsiveness of the driver is lower than said threshold level, said signal indicative of an elevated risk of mismatch between actual driving automation capabilities of said vehicle and driving automation capabilities of said vehicle expected by the driver operating said vehicle.

9. The system according to claim 8, wherein said processing circuitry is configured to determine said at least one alert responsiveness metric value by:
- starting a counter at a first point in time when said alert is provided;
- receiving, at a second point in time, a signal indicative of the driver reacting on said alert;
- stopping said counter when upon receiving said signal indicative of the driver reacting on said alert;
- determining a driver reaction time based on a value of said counter; and
- determining said at least one alert responsiveness metric value based on said driver reaction time.

10. The system according to claim 8, wherein said processing circuitry is further configured to provide a signal for triggering said alert.

11. The system according to claim 7, wherein said processing circuitry is further configured to:
- determine, based on said at least one physical property of the driver indicative of a gaze direction of the driver, at least a second visual attention metric value indicative of a current level of visual attention to a traffic scene ahead of said vehicle;
- compare said at least second visual attention metric value to at least a second threshold value indicative of a second predefined threshold level of visual attention to the traffic scene ahead of said vehicle; and
- provide, when the comparison indicates that the current level of visual attention to the traffic scene ahead of the vehicle is higher than said second threshold level, said signal indicative of an elevated risk of mismatch between actual driving automation capabilities of said vehicle and driving automation capabilities of said vehicle expected by the driver operating said vehicle.

12. The system according to claim 7, wherein:
- said processing circuitry comprises an output coupled to said driving automation system; and
- said processing circuitry is further configured to:
  - provide at said output, following detection of an elevated risk of mismatch between actual driving automation capabilities of said vehicle and driving automation capabilities of said vehicle expected by the driver operating said vehicle, a command to said driving automation system to modify said at least one driving automation property of said vehicle.

13. The system according to claim 7, wherein said at least one sensor and said processing circuitry are disposed in said vehicle.

14. A system for evaluating a current risk of mismatch between actual driving automation capabilities of a vehicle having a driving automation system and driving automation capabilities of said vehicle expected by a driver operating said vehicle, said system comprising:

at least one sensor for sensing at least one physical property of a driver indicative of a gaze direction of the driver; and processing circuitry coupled to said at least one sensor and configured to:
  receive, from said at least one sensor, a signal indicative of said at least one physical property of the driver;
  determine, based on said at least one physical property, at least a first visual attention metric value indicative of a current level of visual attention to a traffic scene ahead of said vehicle;
  compare said at least first visual attention metric value to at least a first threshold value indicative of a first predefined threshold level of visual attention to the traffic scene ahead of said vehicle;
  provide, when the comparison indicates that a current level of visual attention to the traffic scene ahead of said vehicle is lower than said first threshold level, a signal indicative of an elevated risk of mismatch between said actual driving automation capabilities of said vehicle and said driving automation capabilities of said vehicle expected by the driver operating said vehicle;
  provide, responsive to said signal indicative of said elevated risk of mismatch between said actual driving automation capabilities of said vehicle and said driving automation capabilities of said vehicle expected by the driver operating said vehicle, a command to said driving automation system to reduce perceived driving automation capabilities of said vehicle;
  determine at least one alert responsiveness metric value, indicative of the driver's responsiveness to an alert;
  compare said at least one alert responsiveness metric value to at least one threshold value indicative of a predefined threshold level of alert responsiveness; and
  provide, when the comparison indicates that the alert responsiveness of the driver is lower than said threshold level, said signal indicative of an elevated risk of mismatch between actual driving automation capabilities of said vehicle and driving automation capabilities of said vehicle expected by the driver operating said vehicle;
  wherein said processing circuitry is configured to determine said at least one alert responsiveness metric value by:
    starting a counter at a first point in time when said alert is provided;
    receiving, at a second point in time, a signal indicative of the driver reacting on said alert;
    stopping said counter when upon receiving said signal indicative of the driver reacting on said alert;
    determining a driver reaction time based on a value of said counter; and
    determining said at least one alert responsiveness metric value based on said driver reaction time.

15. The system according to claim 14, wherein said processing circuitry is further configured to provide a signal for triggering said alert.

16. The system according to claim 14, wherein said processing circuitry is further configured to:
  determine, based on said at least one physical property of the driver indicative of a gaze direction of the driver, at least a second visual attention metric value indicative of a current level of visual attention to a traffic scene ahead of said vehicle;
  compare said at least second visual attention metric value to at least a second threshold value indicative of a second predefined threshold level of visual attention to the traffic scene ahead of said vehicle; and
  provide, when the comparison indicates that the current level of visual attention to the traffic scene ahead of the vehicle is higher than said second threshold level, said signal indicative of an elevated risk of mismatch between actual driving automation capabilities of said vehicle and driving automation capabilities of said vehicle expected by the driver operating said vehicle.

17. The system according to claim 14, wherein:
  said processing circuitry comprises an output coupled to said driving automation system; and
  said processing circuitry is further configured to:
    provide at said output, following detection of an elevated risk of mismatch between actual driving automation capabilities of said vehicle and driving automation capabilities of said vehicle expected by the driver operating said vehicle, a command to said driving automation system to modify said at least one driving automation property of said vehicle.

18. The system according to claim 14, wherein said at least one sensor and said processing circuitry are disposed in said vehicle.

* * * * *